(12) United States Patent
Crouch

(10) Patent No.: US 7,184,531 B2
(45) Date of Patent: Feb. 27, 2007

(54) SYSTEM AND METHOD FOR AUTHORIZING A PARTY TO JOIN A CONFERENCE

(75) Inventor: Richard W. Crouch, Gustine, CA (US)

(73) Assignee: Siemens Communications, Inc., Boca Raton, FL (US)

( * ) Notice: Subject to any disclaimer, the term of this patent is extended or adjusted under 35 U.S.C. 154(b) by 634 days.

(21) Appl. No.: 10/456,017

(22) Filed: Jun. 5, 2003

(65) Prior Publication Data

US 2004/0246332 A1    Dec. 9, 2004

(51) Int. Cl.
*H04M 3/42*     (2006.01)
*H04M 11/00*    (2006.01)
*H04L 12/16*    (2006.01)

(52) U.S. Cl. ............................. 379/202.01; 379/93.21; 370/260; 370/261

(58) Field of Classification Search ................ 370/260, 370/261, 262; 379/93.21, 142.05, 202.01, 379/203.01
See application file for complete search history.

(56) References Cited

U.S. PATENT DOCUMENTS

| | | | | |
|---|---|---|---|---|
| 5,473,363 A | * | 12/1995 | Ng et al. ................. | 348/14.09 |
| 5,619,555 A | * | 4/1997 | Fenton et al. ............ | 379/88.11 |
| 5,625,407 A | * | 4/1997 | Biggs et al. ............. | 348/14.11 |
| 5,673,080 A | * | 9/1997 | Biggs et al. ............. | 348/14.09 |
| 5,689,553 A | * | 11/1997 | Ahuja et al. ............ | 379/202.01 |
| 5,812,652 A | * | 9/1998 | Jodoin et al. ........... | 379/205.01 |
| 5,812,653 A | | 9/1998 | Jodoin et al. | |
| 5,844,973 A | | 12/1998 | Venkatraman et al. | |
| 5,862,329 A | * | 1/1999 | Aras et al. ............... | 709/204 |
| 5,903,629 A | * | 5/1999 | Campbell et al. ........ | 379/88.24 |
| 5,978,463 A | * | 11/1999 | Jurkevics et al. ...... | 379/202.01 |
| 6,148,068 A | | 11/2000 | Lowery et al. | |
| 6,192,119 B1 | | 2/2001 | Wilson | |
| 6,236,644 B1 | * | 5/2001 | Shuman et al. ............ | 370/261 |

(Continued)

OTHER PUBLICATIONS

Rosenberg, et al., "A Framework for Conferencing with the Session Initiation Protocol," IETF WG Sipping, Feb. 12, 2003, XP002291779.

(Continued)

*Primary Examiner*—Bing Q. Bui

(57) ABSTRACT

A system, method, apparatus, means, and computer program code for allowing an authorized party to join a conference are provided. In some embodiments, an application may create or generate a request for an MCU to handle an ad-hoc or meet-me type conference. The application may provide the request to an MCU resource controller or other device. The MCU resource controller may have knowledge of the capabilities of one or more MCUs and be able to assign an MCU to host or otherwise handle the conference. In addition, the MCU resource controller may create or generate a resource address that a participant in the conference may use to access the assigned MCU. The MCU resource controller can provide the resource address to the application, which may then distribute the resource address to one or more parties participating in the conference. The resource address may include or have associated data that the assigned MCU can use to validate or authorize a party to join the conference.

25 Claims, 6 Drawing Sheets

U.S. PATENT DOCUMENTS

| | | |
|---|---|---|
| 6,272,214 B1 | 8/2001 | Jonsson |
| 6,304,648 B1 * | 10/2001 | Chang ................... 379/202.01 |
| 6,463,038 B1 | 10/2002 | Wilson |
| 6,466,252 B1 * | 10/2002 | Miyazaki ..................... 370/260 |
| 6,633,324 B2 * | 10/2003 | Stephens, Jr. ............ 348/14.09 |
| 6,754,322 B1 * | 6/2004 | Bushnell ................ 379/202.01 |
| 2002/0078153 A1 | 6/2002 | Crescenzo et al. |

OTHER PUBLICATIONS

Stillman, et al., "Threats Introduced by Rserpool and Requirements for Security in Response to Threats," IETF WG Network, Dec. 12, 2002, XP002291780.

* cited by examiner

SYSTEM AND METHOD FOR AUTHORIZING A PARTY TO JOIN A CONFERENCE

FIELD OF THE INVENTION

The present invention relates to telecommunications systems and, in particular, to an improved system and method for allowing an authorized party to join a conference.

BACKGROUND

The development of various voice over IP protocols such as the H.323 Recommendation and the Session Initiation Protocol (SIP) has led to increased interest in multimedia conferencing. In such conferencing, typically, a more or less central server or other device manages the conference and maintains the various communications paths to computers or other client devices being used by parties to participate in the conference. Parties to the conference may be able to communicate via voice and/or video through the server and their client devices.

Instant messaging can provide an added dimension to multimedia conferences. In addition to allowing text chatting, instant messaging systems such as the Microsoft Windows Messenger™ system can allow for transfer of files, document sharing and collaboration, collaborative whiteboarding, and even voice and video. A complete multimedia conference can involve multiple voice and video streams, the transfer of files, marking-up of documents, and whiteboarding.

When a party attempts to call into or otherwise join a conference, the party must be authenticated or their permission to the join the conference validated. In traditional communication systems, this may be done by a password provided by the party or via use of a trust relationship. However, distributing and entering passwords may complicate the process and a trust relationship may not be easily verified. In addition, maintaining and updating a shared database may be complex and does not eliminate the ability of a party to guess a valid identifier that may allow access to a conference.

As such, there is a need for a system and method for insuring that only authorized parties or allowed to join a conference and/or for validating a potential party as being allowed to join a conference.

SUMMARY

Embodiments provide a system, method, apparatus, means, and computer program code that allow an application or controller to determine or allocate an MCU (multi-point control unit or multi-channel conferencing unit) to be used for or to host or otherwise handle a conference and determine a resource address for the conference. For example, in some embodiments, an application may create a request for allocation of an MCU to handle an ad-hoc or meet-me type conference. The application may provide the request to an MCU resource controller. The MCU resource controller may have or be able to obtain knowledge of the capabilities of one or more MCUs and be able to assign or otherwise allocate an MCU to host or otherwise handle the conference. In addition, the MCU resource controller may create a resource address that a participant in the conference may use to access the MCU in order to call into or join the conference. The MCU resource controller can provide the resource address to the application, which may then distribute the resource address to one or more parties participating in the conference. The resource address may include or have associated data (herein referred to as a "validation token") created by the MCU resource controller that the MCU can use to validate or authorize a party to join the conference. Thus, the validation token may be associated with the MCU and the conference. In some embodiments, the validation token may be included in the resource address. In other embodiments, the validation token may secure the resource address.

Additional advantages and novel features of the invention shall be set forth in part in the description that follows, and in part will become apparent to those skilled in the art upon examination of the following or may be learned by the practice of the invention.

According to some embodiments, a method for facilitating access to a conference may include an MCU resource controller receiving a request from an application for allocation of an MCU for a conference; the MCU resource controller determining a MCU to handle the conference; the MCU resource controller creating a resource address associated with the conference and the MCU, wherein the resource address includes or otherwise has an associated validation token; and the MCU resource controller providing the resource address to the application. Other embodiments may include means, systems, computer code, etc. for implementing some or all of the elements of the methods described herein.

According to some embodiments, a system for facilitating a conference may include an MCU resource controller in communication with an application and one or more MCUs. The MCU resource controller may receive a request from the application for an MCU to host or otherwise handle a conference. The MCU resource controller may select or otherwise determine the MCU and provide a resource address to the application, the resource address being associated with the MCU and including or having an associated validation token usable by a party to join the conference via a user device. The party may provide the resource address to the selected MCU to join the conference.

According to some embodiments, a system may include an application in communication with an MCU resource controller; wherein the application is adapted to provide a request to the MCU resource controller to allocate an MCU for a conference; wherein the MCU resource controller is adapted to allocate an MCU to host the conference and to create a resource address associated with the MCU and the conference; wherein the resource address includes or has an associated validation token; and wherein the MCU resource controller is adapted to provide the resource address to the application.

With these and other advantages and features of the invention that will become hereinafter apparent, the nature of the invention may be more clearly understood by reference to the following detailed description of the invention, the appended claims and to the several drawings attached herein.

BRIEF DESCRIPTION OF THE DRAWINGS

The accompanying drawings, which are incorporated in and form a part of the specification, illustrate the preferred embodiments, and together with the descriptions serve to explain the principles of the invention.

DETAILED DESCRIPTION

Applicant has recognized that there is a market opportunity for systems, means, computer code, and methods that allow an application or MCU resource controller to determine or allocate an MCU (multipoint control unit or multi-channel conferencing unit) to be used for or to handle a conference. In some embodiments, the application may create and send a request to the MCU resource controller for allocation of an MCU to handle (e.g., host) an ad-hoc or meet-me type conference. The MCU resource controller may have knowledge of the capabilities of one or more MCUs and be able to assign the MCU to the conference. In addition, the MCU resource controller may create a resource address that a participant in the conference may use to access the MCU in order to join or call into the conference. The MCU resource controller can provide the resource address to the application, which may then distribute the resource address to one or more parties participating in the conference. In some embodiments, the resource address may include or have associated data (herein referred to as a "validation token") created by the MCU resource controller. A party attempting to join the conference may provide the resource address to the MCU. The MCU may use the validation token to determine if the party is authorized to join the conference.

Figure 1:
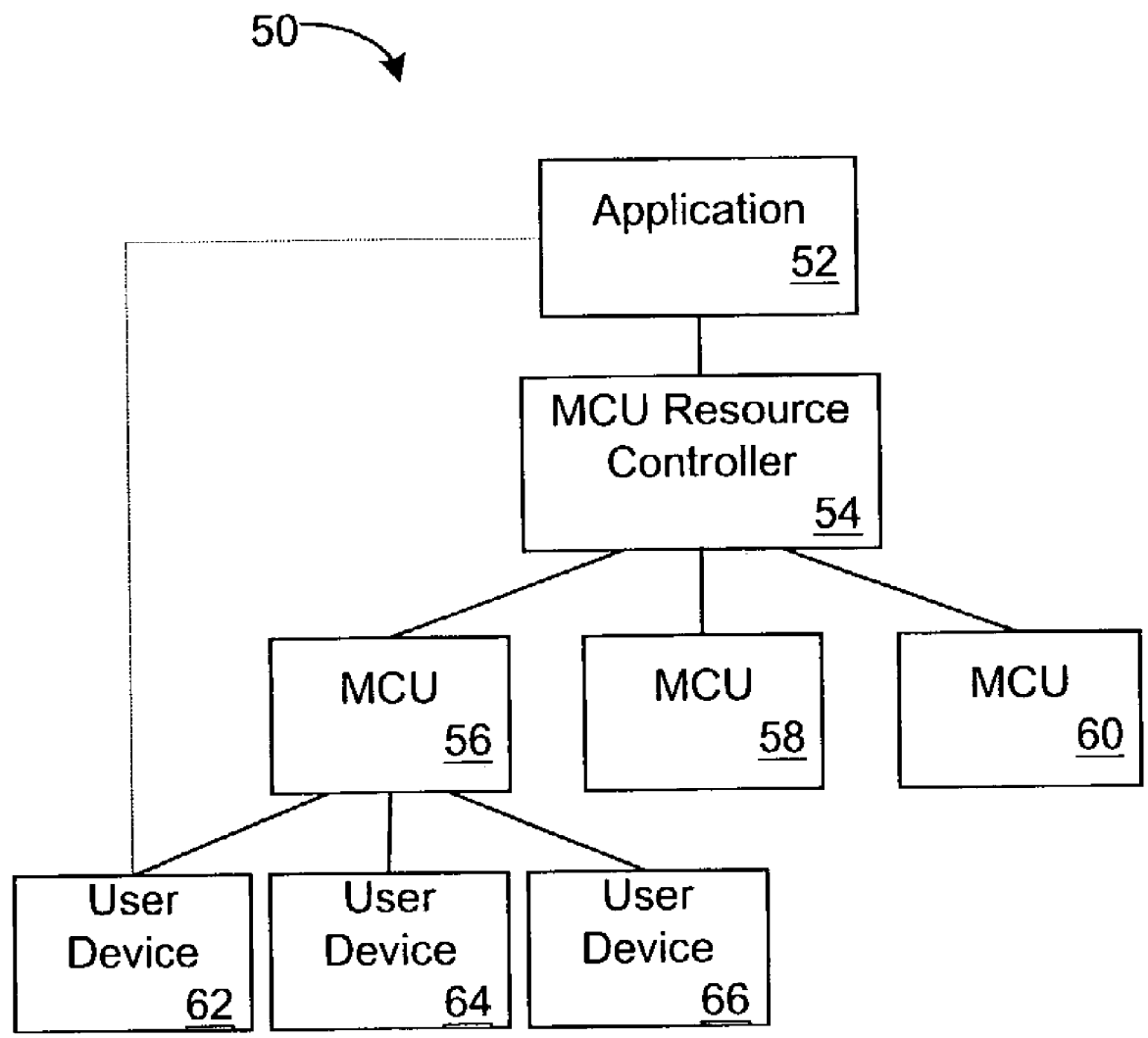
FIG. 1 is a block diagram illustrating a system according to some embodiments.

Referring now to FIG. 1, a system 50 is illustrated that may be used in some embodiments. The system 50 includes an application 52 in communication with an MCU resource controller 54, which is itself in communication with one or more MCUs 56, 58, 60 that can support, host or otherwise handle conference calls between user devices (e.g., telephones, computers). While three MCUs are illustrated in FIG. 1, in some embodiments less or more MCUs may be involved or used. In addition, in some embodiments, an MCU may include or be associated with one or more multipoint controllers and one or more multipoint or media processors.

An MCU may support conferences or other communications between user devices. For example, the MCU 56 may be used to support a voice or multimedia conference between user devices 62, 64, 68. One or more of the user devices 62, 64, 68 may be in communication with the application 52 in order to initiate a conference. For example, the user device 62 may include some or all of the application 52 or another application that may include a buddy list or contact list from which a party can select names of other parties that the party wants in the conference. After receiving or determining information regarding the time/date of the conference and the number of parties in the conference, the application 52 may provide a request to the MCU resource controller 54 for an MCU to host the conference. The MCU resource controller 54 may then allocate the MCU 56 for the conference.

In some embodiments, the application 52 may be operating or installed on a computer, computer system, server or other device and/or may be part of or used with a conference or collaboration system. For example, the application 52 may be or include software that facilitates, schedules, and/or initiates ad-hoc or meet-me type conferences between multiple parties. Each of the parties may participate in the conference via a user device. The application 52 may generate a request for allocation of MCU resources to support a conference and send or otherwise provide the request to the MCU resource controller 54. In some embodiments, the request may include data indicative of the type of conference, the conference media preferences (e.g., voice), the number of channels requested, the time and/or date of the conference, a SIP URI (uniform resource identifier) or other identifier of an existing conference if the new request is for an expansion of an existing conference, etc.

In some embodiments, the MCU resource controller 54 may be, include, or be part of a server, computer, software application or other device or software program. In some embodiments, the MCU resource controller 54 may be part of a conference or collaboration system or other telecommunications system. In some embodiments, the application 52 may be resident or operating on the same device as the MCU resource controller 54 or be physically or topologically separate from the MCU resource controller 54. The application 52 may communicate with the MCU resource controller 54 directly or indirectly via a LAN (Local Area Network), WAN (Wide Area Network), or other communications network.

In some embodiments, the MCU resource controller 54 may maintain, update, or communicate with a list, database, or other resource for storing information regarding the capacities of one or more of the MCUs 56, 58, 60. The capacities may be based on values provided by the MCUs. For example, when an MCU starts up, it may locate, communicate with, and/or register with the MCU resource controller 54. As part of such registration, the MCU may pass or otherwise provide information to the MCU resource controller 54 regarding the current capabilities and capacities of the MCU.

In some embodiments, an MCU may be implemented in a combination of hardware/software and may be operating on or part of the same device as the MCU resource controller 54 or be physically or topologically separate from the MCU resource controller 54. In some embodiments, an MCU may communicate with the MCU resource controller 54 directly or indirectly via a LAN (Local Area Network), WAN (Wide Area Network), or other communications network. Each MCU may be associated with a server that has an associated server name (e.g., siemensMCU.com).

Following registration of an MCU with the MCU resource controller 54, the MCU may maintain or initiate a keep alive dialogue with the MCU resource controller 54 in which the MCU sends or provides the MCU resource controller 24 with keep alive messages. Each keep alive message received or obtained by the MCU resource controller 54 from an MCU may report the current capacities of the MCU. If the MCU loses contact with the MCU resource controller 54, the MCU may attempt to reregister with the MCU resource controller 54 and may continue to honor valid conference requests. If the MCU resource controller 54 does not receive or obtain a keep alive message from an MCU in a timely manner or within a designated or expected time period, the MCU resource controller 54 may set the capacities of the MCU to zero until such time as the keep alive message is received from the MCU or the MCU reregisters with the MCU resource controller 54.

When the MCU resource controller 54 receives or otherwise obtains a request from the application 52 for allocation of an MCU for a conference, the MCU resource controller 54 will check the available MCUs 56, 58, 60 and their capacities and allocate the request to one of the MCUs 56, 58, 60. Thus, the MCU resource controller 54 determines which MCU will be associated with the request or handle the conference described in the request. The MCU resource controller 54 then will create or otherwise generate a resource address, which in some embodiments may be or include a SIP URI, from the server name of the selected MCU and a unique conference identifier associated with the conference. In some embodiments, the MCU resource controller 54 may establish or select the conference identifier. In other embodiments, the application 52 may determine or select the conference identifier and provide the conference identifier with or as part of the request the application 52 sends to the MCU resource controller 54.

As one example of a SIP URI used as a resource address, suppose a conference is scheduled to start at 9:00 am and last for two hours. The SIP INVITE that is used to establish the call may include the following:

INVITE  sip:<Conf  1234  S0900  E1100  Token 7ejdytszunj@siemensMCU.com>SIP/2.0
    From: BigGuy <sip: UserA@here.com>;tag=9fxced76sl
    To:  MCU  <sip:Conf  1234  S0900  E1100  Token 7ejdytszunj@siemensMCU.com>
    Call-ID: 12345601@here.com
    Contact: <sip:UserA@100.101.102.103> where "BigGuy <sip:UserA@here.com>;tag=9fxced76sl" indicates the SIP URI of the person attempting to enter the conference., "MCU <sip:Conf 1234 S0900 E1100 Token7ejdytszunj@siemensMCU.com>" indicates the SIP URI assigned to the conference call. It contains the conference start and end time (Conf S0900 E1100), the validation token (Token 7ejdytszunj ) and the address of the MCU_ (siemensMCU.com), "12345601@here.com indicates a unique identifier used to differentiate this call from others placed by user A","

In some embodiments, when the application receives the resource address, it may provide it to one or more parties who will be participating in the conference, which may happen via email, an instant message communication, or other form of communication. Alternatively, in some embodiments, one of the parties participating in the conference may forward the resource address to other parties who are going to participate in the conference. If caller identification is being used, different parties may receive slightly different resource address, each reflecting the caller identifier associated with the device associated with a particular party.

As previously described above, the resource address may include a string of data (herein referred to as a "validation token"). Some or all of the validation token may be created or encoded using cryptographic procedures, algorithms, or techniques, such as those based on a shared secret or access to a third party with a shared secret, public key cryptography, proprietary coding scheme, etc. Thus, in some embodiments, the MCU resource controller 54 may have the appropriate software for or be programmed with, include or use cryptographic procedures, algorithms, or techniques to determine, create, or encode the validation token. In some embodiments, the validation token can be used to secure the entire conference address from modification by parties that have access to the conference address. This can be by the means of a checksum or other cryptographic means. An MCU may receive the checksum along with or as part of a resource address or validation token and use the checksum to determine whether or not a resource address or conference address has been modified. Thus, the checksum is associated with the resource address. In some embodiments, a validation token may include information regarding a conference identifier, party or caller identifier, resource identifier, device identifier, telephone number identifier, etc., some or all of which may be encoded.

The MCU resource controller 54 can provide a validation token along with, in, or as part of the resource address provided to the application 52. The application 52 then can pass the validation token with the remainder of the resource address to one or more parties. Such parties then will use the resource addresses to access the correct MCU assigned to host or otherwise handle the conference. The MCU will use the validation token to validate that the call is authorized to join or participate in the conference. Thus, in some embodiments, the MCU may be have the appropriate software for or be programmed with, include or use cryptographic procedures, algorithms, or techniques to determine or decode the validation token. In this manner the validation token facilitates integrity between the MCU resource controller 54 generating the resource address based on an MCU allocated to a conference and the party ultimately using the resource address to access the MCU. The validation token can be used to contain or secure information contained within the resource address.

A validation token in a resource address may be used to validate several aspects of a call. For example, in some embodiments, a validation token may be used to validate that a conference identifier in the resource address was generated by the MCU resource controller 54 and was not modified. This may prevent parties from generating their own conference identifiers and/or from modifying an existing conference identifier to obtain or access conference resources without permission.

As another example, in some embodiments, a validation token may contain or be used to validate a calling party's identification to allow for a conference identifier that can only be used by the party the conference identifier is assigned to. This allows the generation of individual conference addresses that can only be used by the indicated caller and prevents other parties that may have obtained the resource address from using it to join the conference. Each party calling into a conference will have a different resource address specifically associated with the party's identification (or the identification of a device associated with or being used by the party).

As one example of the case of the caller identification being part of the conference address that is secured by the validation token, the caller identification is part of the message used to set up the call. See the following example from SIP:

INVITE    MCU    <sip:CONF1234    UID"sip: UserA@here.com"    Token 7ejdytszunj@siemensMCU.com> SIP/2.0
    From: BigGuy <sip:UserA@here.com>;tag=9fxced76sl
    To: MCU <sip:CONF1234 UID"sip:UserA@here.com" Token 7ejdytszunj@siemensMCU.com>
    Call-ID: 12345601@here.com
    CSeq: 1 INVITE
    Contact: <sip:UserA@100.101.102.103>

In this example the SIP URI in the "To:" field contains the caller identification (e.g., UID"sip:UserA@here.com") as part of the SIP URI. The receiving device (e.g., an MCU hosting a conference) matches this with the identification from the "From:" header to see if they match. If they do not match, the call is rejected. The receiving device may need to decode or decrypt the validation token to obtain the caller identification information from the validation token.

In another example, in some embodiments, a validation token may contain or be used to validate the starting time of a conference and/or the ending time of a conference. The information may be encoded in the validation token or contained in the text of the URI. This prevents parties with a valid conference identifier from using it at times other than indicated in the request or when the conference identifier was generated and used to create the validation token.

In another example, in some embodiments, a validation token may contain or be used to validate a maximum size for the conference. This prevents parties with a valid conference identifier from using more conference resources than was indicated in the request or when the conference identifier was generated and used to create the validation token. The maximum size information may be encoded in the validation token or contained in the text of the URI.

In another example, in some embodiments, the validation token may contain or be used to validate resources (e.g., video) assigned to a conference. This prevents parties with a valid conference identifier from using more conference resources than was indicated in the request or when the conference identifier was generated and used to create the validation token. The resource information may be encoded in the validation token or contained in the text of the URI.

In another example, in some embodiments, the validation token may contain or is used to validate a counter than allows a conference identifier to only be used once. This prevents parties with a valid conference identifier from using more conference resources than was indicated in the request or when the conference identifier was generated and used to create the validation token. The conference identifier or counter information may be encoded in the validation token or contained in the text of the URI.

In some embodiments, a resource address may include one or more of the following: data indicative of an identifier associated with the conference; data indicative of an identifier associated with a party allowed to participate in the conference; data indicative of a start time associated with the conference; data indicative of an ending time associated with the conference; data indicative of a maximum size associated with the conference; data indicative of a resource assigned to the conference; data indicative of the application; and/or data indicative of the MCU. The validation token may be secured in the resource address by the validation token, even if the validation token does not include the information. For example, the validation token may include a checksum or other protection to determine if the resource address of the information has been modified.

As illustrated by the discussion above, in some embodiments, an application in communication with an MCU resource controller; wherein the application is adapted to provide a request to the MCU resource controller to allocate an MCU for a conference; wherein the MCU resource controller is adapted to allocate an MCU to host the conference and to create a resource address associated with the MCU and the conference; wherein the resource address includes a validation token; and wherein the MCU resource controller is adapted to provide the resource address to the application. Upon receipt by the MCU, the validation token may be cryptographically validated by the MCU and used to validate one or more aspects of the call. Some or all of the validation token may be encoded using cryptographic procedures, software, algorithms, etc. known or used by the MCU and/or the MCU resource controller.

In the case of an ad-hoc type conference, a party may already have a session establish with other parties. At the signaling level it may be possible for the party to send a signaling message asking the participants' phones to transfer the call to an MCU using the resource address. In such a scenario, the "to:" field of a transfer request may contain a resource address (e.g., SIP URI) with the appropriate validation token. The party may obtain the resource address from the application 52 when the party uses the application 52 to establish the ad-hoc conference.

While the examples described above is based on a conferencing scenario, in other embodiments calls may be authorized to be placed to other resources such as gateways, voicemail systems, dictation servers, and playback servers managed by an MCU resource controller. Thus, the term "MCU resource controller" as used herein is not limited to use in conferencing.

Process Description

Figure 2:
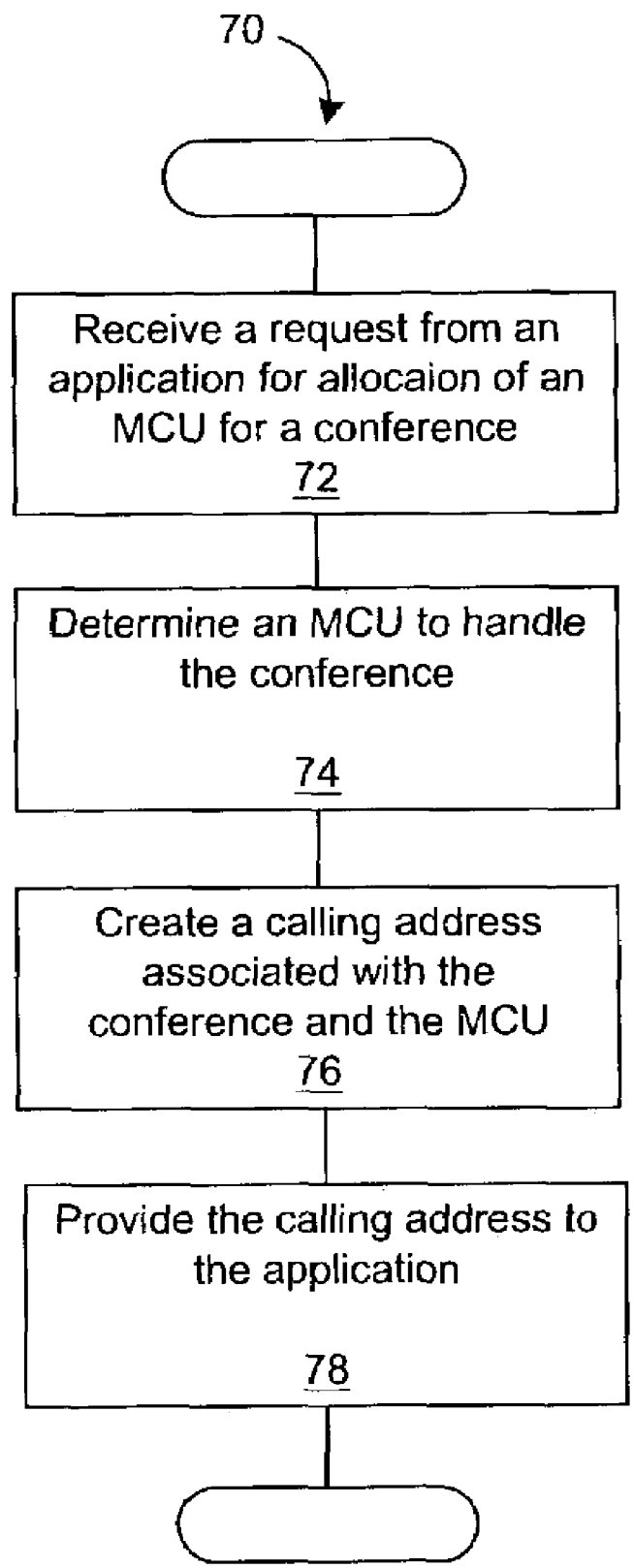
FIG. 2 is a flowchart of a method in accordance with some embodiments.

Reference is now made to FIG. 2, where a flow chart 70 is shown which represents the operation of a first embodiment of a method. The particular arrangement of elements in the flow chart 70 is not meant to imply a fixed order to the method 70; embodiments can be practiced in any order that is practicable. In some embodiments, some or all of the elements of the method 70 may be performed or completed by the MCU resource controller 54 or another device or application, as will be discussed in more detail below. Additional elements for the method 70 may be performed by the MCU resource controller 54 or the application 52.

Processing begins at 72 during which the MCU resource controller 54 receives or otherwise obtains a request from an application (e.g., the application 52) for allocation of an MCU for a conference. In some embodiments, the request may be, include or comprise data indicative of a type of conference, the date of the conference, a start time for the conference, an end time for the conference, a number of channels for the conference, a number of participants in the conference, a resource address of and existing conference (e.g., if the request is to expand an existing conference), an identifier associated with the conference, an identifier associated with a party allowed to participate in the conference, the maximum size of the conference, a resource assigned to the conference, an identifier associated with the application, etc.

During 74, the MCU resource controller 54 selects, allocates, or otherwise determines an MCU to host or otherwise handle or process the conference. The selection or determination may be made on the basis of the needs for the conference, the availability of one or more MCUs, and the capacities or capabilities of one or more MCUs.

During 76, the MCU resource controller 54 creates, establishes, or otherwise generates a resource address associated with the conference. The resource address may have a validation token as previously described above.

In some embodiments, the validation token may include, be, or comprise data indicative of a maximum size associated with the conference, a resource assigned to the conference, the application providing the request, the MCU determined during 72, the type of conference, an identifier of a party allowed to participate in the conference (which, in some embodiments, may be a calling identification or other identifier associated with a device that is associated with the party), a start time and/or end time associated with the conference, a date associated with the conference, etc. In some embodiments where more than one party is going to participate in the conference, a different validation token and/or resource address may be created for each party. For example, each party may have or receive an associated validation token as part of a resource address that identifies or differentiates the party or a device associated with the party from other parties or devices when the party or device attempts to join a conference.

In some embodiments, 76 may include the conference having an associated first party and a second party allowed to participate in said conference, wherein creating a resource address associated with the conference and the MCU includes creating a first resource address having a first validation token that includes data indicative of the first party (which may include data indicative of a device or identifier associated with a device that is associated with the first party) and creating a second resource address having a second validation token that includes data indicative of the second party (which may include data indicative of a device or identifier associated with a device that is associated with the second party).

In some embodiments, the validation token may be encoded using a public or private encryption or encoding scheme or technique. The MCU selected during 74 may be able to decode the validation token to obtain the desired information. Thus, the MCU (e.g., the MCU 56) may include software or other code that allows it to receive a validation token, receive a resource address, allow access to a conference, disallow access to the conference, decode some or all of a validation token, etc.

During 78, the MCU resource controller 54 sends or other provides the resource address for the conference to the application. The application may then send (e.g., via email or instant message communication), display, or otherwise provide the resource address to one or more parties or devices associated with the parties.

In some embodiments, the method 70 may include the MCU resource controller 54 receiving data from the MCU determined during 74, the data being indicative of a capacity or capability of the MCU. The MCU resource controller 54 data may receive before and/or after 74. In some embodiments, the method 70 may include the MCU resource controller 54 receiving a keep alive message from the MCU determined during 74. The MCU resource controller 54 may receive the keep alive message before and/or after 74. In some embodiments, the method 70 may include registering one or more MCUs, updating and/or maintaining an inventory, list or other representation of one or more MCUs, receiving registration and/or keep alive data or messages, etc.

In some embodiments, the method 70 may include providing a resource address to a party or device. For example, the application 52 or the MCU resource controller 54 may provide the resource address indirectly or directly to a party or a user device (e.g., IP enabled telephone, computer) associated with the party.

In some embodiments, the method 70 may include an MCU allowing access to or participation in a conference by a party that provides the resource address and/or validation token or uses a device to access the MCU determined during 74 and provides via the device the resource address with the validation token. The MCU may receive or otherwise obtain the validation token as part of the resource address.

In some embodiments, the method 70 may include receiving a request to initiation a conference. For example, the application 52 may receive data from a party or device instructing the application 52 to schedule or coordinate a conference.

Figure 3:
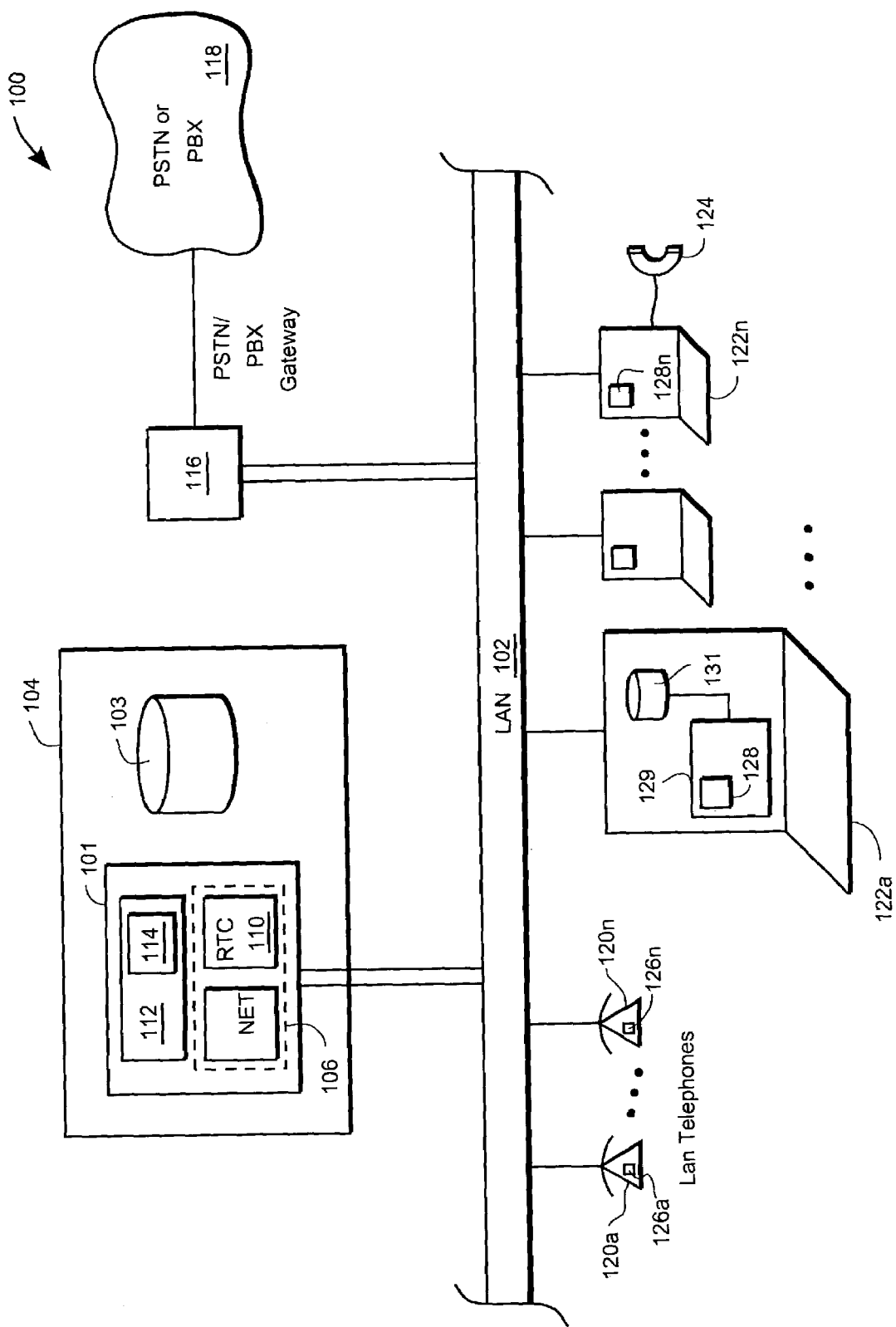
FIG. 3 is a diagram of a conference system according to some embodiments.

Referring now to FIG. 3, a diagram of an exemplary telecommunications system 100 according to some embodiments. The system 100 may implement some embodiments of the system 50 described above and provides a complex example of how the system 50 may be implemented in some embodiments. As shown, the system 100 includes a local area network (LAN) 102. The LAN 102 may be implemented using a TCP/IP network and may implement voice or multimedia over IP using, for example, the Session Initiation Protocol (SIP). Operably coupled to the local area network 102 is a server 104. The server 104 may include one or more controllers 101, which may be embodied as one or more microprocessors, and memory 103 for storing application programs and data. The controller 101 may implement an instant messaging system 106. The instant messaging system may be embodied as Microsoft Windows Messenger™ software or other instant messaging system. Thus, according to (certain embodiments, the instant messaging system 106 implements the Microsoft.Net™ environment 108 and Real Time Communications application (RTC) 110.

In addition, according to some embodiments, a collaboration system 114 may be provided, which may be part of an interactive suite of applications 112, run by controller 101, as will be described in greater detail below. In addition, an action prompt module 115 may be provided, which detects occurrences of action cues and causes action prompt windows to be launched at the clients 122.

Also coupled to the LAN 102 is a gateway 116 which may be implemented as a gateway to a private branch exchange (PBX), the public switched telephone network (PSTN) 118, or any of a variety of other networks, such as a wireless or cellular network. In addition, one or more LAN telephones or other user devices 120a–120n and one or more computers or other user devices 122a–122n may be operably coupled to the LAN 102. In some embodiments, one or more other types of networks may be used for communication between the server 104, computers 122a–122n, telephones 120a–120n, the gateway 116, etc. For example, in some embodiments, a communications network might be or include the Internet, the World Wide Web, or some other public or private computer, cable, telephone, client/server, peer-to-peer, or communications network or intranet. In some embodiments, a communications network also can include other public and/or private wide area networks, local area networks, wireless networks, data communication networks or connections, intranets, routers, satellite links, microwave links, cellular or telephone networks, radio links, fiber optic transmission lines, ISDN lines, T1 lines, DSL connections, etc. Moreover, as used herein, communications include those enabled by wired or wireless technology. Also, in some embodiments, one or more client devices (e.g., the computers 122a–122n) may be connected directly to the server 104.

The computers 122a–122n may be personal computers implementing the Windows XP™ operating system and thus, Windows Messenger™ instant messenger client. In addition, the computers 122a–122n may include telephony and other multimedia messaging capability using, for example, peripheral cameras, Webcams, microphones and speakers (not shown) or peripheral telephony handsets 124, such as the Optipoint™ handset, available from Siemens Corporation. In other embodiments, one or more of the computers may be implemented as wireless telephones, digital telephones, or personal digital assistants (PDAs). Thus, the figures are exemplary only. As shown with reference to computer 122a, the computers may include one or more controllers 129, such as Pentium™ type microprocessors, and storage 131 for applications and other programs.

Finally, the computers 122a–122n may implement Interaction Services 128a–128n according to embodiments. As will be described in greater detail below, the Interaction Services 128a–128n allow for interworking of phone, buddy list, instant messaging, presence, collaboration, calendar and other applications. In addition, according to some embodiments, the Interaction Services 128 allow access to the collaboration system or module 114 and the action prompt module 115 of the server 104 and thus permit the user to access and manipulate conference summaries.

Figure 4:
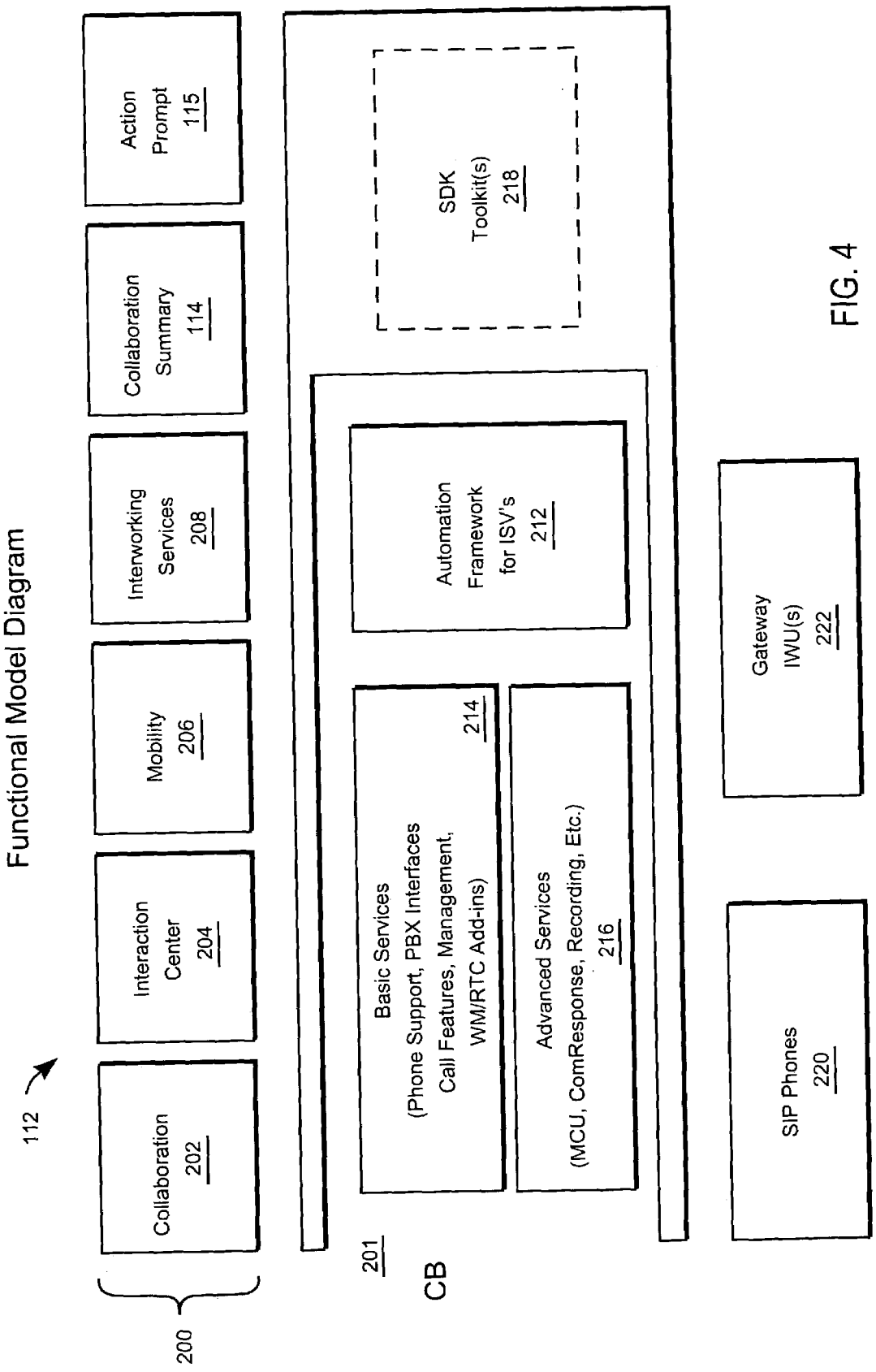
FIG. 4 is a diagram illustrating a conference collaboration system according to some embodiments.

Turning now to FIG. 4, a functional model diagram illustrating the collaboration system 114 is shown. More particularly, FIG. 4 is a logical diagram illustrating a particular embodiment of a collaboration server 104. The server 104 includes a plurality of application modules 200 and a communication broker module 201. One or more of the application modules and communication broker (CB) module 201 may include an inference engine, i.e., a rules or heuristics based artificial intelligence engine for implementing functions according to some embodiments. In addition, the server 104 provides interfaces, such as APIs (application programming interfaces) to SIP phones 220 and gateways/interworking units 222.

According to the embodiment illustrated, the broker module 201 includes a basic services module 214, an advanced services module 216, an automation module 212, and a toolkit module 218. The automation module 212 implements an automation framework for ISVs (independent software vendors) 212 that allow products, software, etc. provided by such ISVs to be used with or created the server 104.

The basic services module 214 functions to implement, for example, phone support, PBX interfaces, call features and management, as well as Windows Messaging™ software and RTC add-ins, when necessary. The phone support features allow maintenance of and access to buddy lists and provide presence status.

The advanced services module 216 implements functions such as presence, multipoint control unit or multi-channel conferencing unit (MCU), recording, and the like. MCU functions may be used for voice conferencing and support ad hoc, meet-me, and dynamic conference creation from a buddy list or other application following the SIP conferencing model for ad hoc conferences, and/or other protocols or models for meet me conferences.

In some embodiments, the advanced server module 216 may include or be in communication with one or more MCUs (e.g., the MCUs 56 or 58) to support conferencing. The advanced server module 216 may include or be in communication with an MCU resource controller such as the MCU resource controller 54 previously described above. Each MCU may periodically provide information to the advanced server module 216 regarding its capabilities and capacities. Each MCU also may locate and register with the advanced server module 216 when the MCU starts up. As part of the registration process, the MCU also may provide information regarding the MCU's capabilities and capacities. Following the registration, the MCU may initiate a keep alive dialogue with the advanced server module 216 or component of the advanced server module 216 (e.g., an MCU resource controller that is part of or in communication with the advanced server module 216) wherein the MCU periodically sends keep alive messages to the advanced server module 216. As part of the keep alive dialogue, the MCU may report its current capabilities to the advanced services module 116. Thus, the advanced services module 116 can maintain an active representation of the current capacities and capabilities of all of the MCUs in the system 100. If the advanced services module 116 does not receive a keep alive message from an MCU in a timely manner, the advanced services module 116 may set the capacities for the MCU to zero.

In a manner similar to that previously discussed above, when the advanced services module 216 receives a request for a conference from an application (e.g., the collaboration application 202), the advanced services module 216 may check the available capacities of MCUs and allocate the request to one of the MCUs. The advanced services module 216 then will construct a SIP URI (uniform resource identifier), also referred to as a resource address, from the name of the MCU selected and a unique conference identifier. The resource address may include a validation token, which may be a string of data that can be cryptographically validated, as previously discussed above. The advanced services module 216 then can provide the resource address back to the application that provided the original MCU request. The advanced services module 216 also may then decrement the capacities of the selected MCU by the conference size allocated.

In certain embodiments, support for G.711 and G.723.1 codecs is provided. Further, in certain embodiments, the MCU can distribute media processing over multiple servers using the MEGACO protocol. In some embodiments, an MCU may provide the ability to set up ad hoc voice, data, or multimedia conferencing sessions. During such conferencing sessions, different client devices (e.g., the computers 122a–122n) may establish channels to the MCU and server 104, the channels carrying voice, audio, video and/or other data from and to participants via their associated client devices. In some cases, more than one participant may be participating in the conference via the same client device. For example, multiple participants may be using a telephone (e.g., the telephone 126a) located in a conference room to participate in the conference. The Real-Time Transport Protocol (RTP) and the Real Time Control Protocol (RTCP) may be used to facilitate or manage communications or data exchanges between the client devices for the participants in the conference.

Presence features provide device context for both SIP registered devices and user-defined non-SIP devices. Various user contexts, such as In Meeting, On Vacation, In the Office, etc., can be provided for. In addition, voice, e-mail, and instant messaging availability may be provided across the user's devices. The presence feature enables real time call control using presence information, e.g., to choose a destination based on the presence of a user's device(s). In addition, various components have a central repository for presence information and for changing and querying presence information. In addition, the presence module provides a user interface for presenting the user with presence information.

In addition, the broker module 201 may include the ComResponse™ platform, available from Siemens Information and Communication Networks, Inc. The ComResponse™ platform features include speech recognition, speech-to-text, and text-to-speech, and allows for creation of scripts for applications. The speech recognition and speech-to-text features may be used by the collaboration summarization unit 114 and the action prompt module 115.

In addition, real time call control is provided by a SIP API 220 associated with the basic services module 214. That is, calls can be intercepted in progress and real time actions performed on them, including directing those calls to alternate destinations based on rules and or other stimuli. The SIP API 220 also provides call progress monitoring capabilities and for reporting status of such calls to interested applications. The SIP API 220 also provides for call control from the user interface.

The toolkit module 218 may provide tools, APIs, scripting language, interfaces, software modules, libraries, software drivers, objects, etc. that may be used by software developers or programmers to build or integrate additional or complementary applications.

According to the embodiment illustrated, the application modules include a collaboration module 202, an interaction center module 204, a mobility module 206, an interworking services module 208, a collaboration summarization module 114, and an action prompt module 115.

The collaboration module 202 allows for creation, modification or deletion of a collaboration session for a group of users. The collaboration module 202 may further allow for invoking a voice conference from any client. In addition, the collaboration module 202 can launch a multi-media conferencing package or application, such as the WebEX™ package. It is noted that the multi-media conferencing can be handled by other products, applications, devices, etc. In some embodiments, the collaboration module 202 may be or include an application that wants to initiate a conference. The application may send a request for the conference or an MCU to handle the conference to the collaboration broker 201 or, more specifically, to the advanced services module 216 (which may be, function as, or include an MCU resource controller).

The interaction center 204 provides a telephony interface for both subscribers and guests. Subscriber access functions include calendar access and voicemail and e-mail access. The calendar access allows the subscriber to accept, decline, or modify appointments, as well as block out particular times. The voicemail and e-mail access allows the subscriber to access and sort messages.

Similarly, the guest access feature allows the guest access to voicemail for leaving messages and calendar functions for scheduling, canceling, and modifying appointments with subscribers. Further, the guest access feature allows a guest user to access specific data meant for them, e.g., receiving e-mail and fax back, etc.

The mobility module 206 provides for message forwarding and "one number" access across media, and message "morphing" across media for the subscriber. Further, various applications can send notification messages to a variety of destinations, such as e-mails, instant messages, pagers, and the like. In addition, the subscriber can set rules that the mobility module 206 uses to define media handling, such as e-mail, voice and instant messaging handling. Such rules specify data and associated actions. For example, a rule could be defined to say "If I'm traveling, and I get a voicemail or e-mail marked Urgent, then page me."

Further, the collaboration summarization module 114 is used to identify or highlight portions of a multimedia conference and configure the portions sequentially for later playback. The portions may be stored or identified based on recording cues either preset or settable by one or more of the participants in the conference, such as a moderator. The recording cues may be based on vocalized keywords identified by the voice recognition unit of the ComResponse™ module, or may be invoked by special controls or video or whiteboarding or other identifiers.

The action prompt module 115 similarly allows a user to set action cues, which cause the launch of an action prompt window at the client. In response, the clients 122 can then perform various functions.

Figure 5:
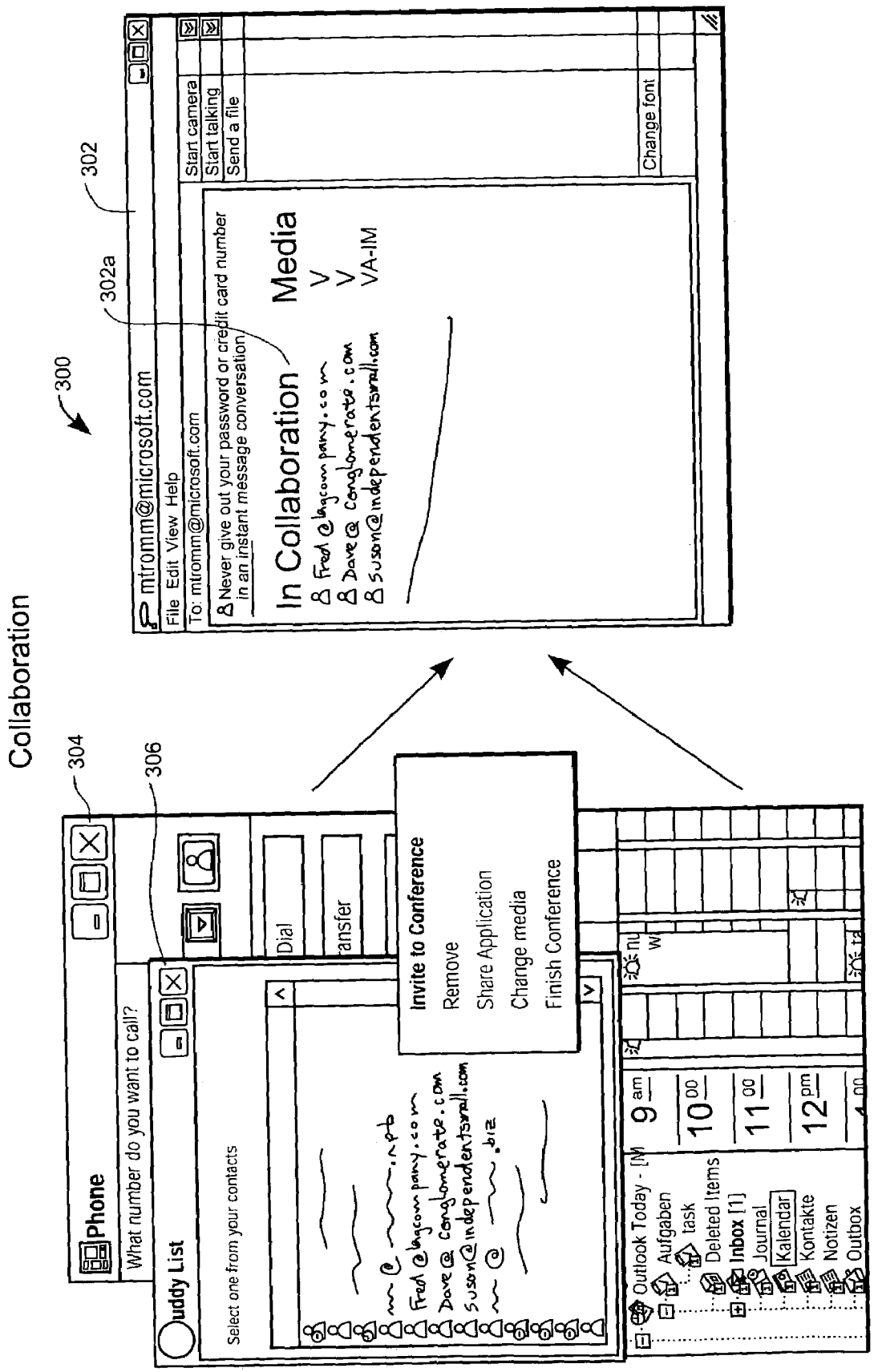
FIG. 5 is a diagram illustrating a graphical user interface according to some embodiments.

Turning now to FIG. 5, a diagram of a graphical user interface 300 according to some embodiments is illustrated. In particular, shown are a variety of windows for invoking various functions. Such a graphical user interface 300 may be implemented on one or more of the network clients (e.g., the computer 122a). Thus, the graphical user interface 300 interacts with the Interactive Services unit 128 to control collaboration sessions.

Shown are a collaboration interface 302, a phone interface 304, and a buddy list 306. It is noted that other functional interfaces may be provided. According to particular embodiments, certain of the interfaces may be based on, be similar to, or interwork with, those provided by Microsoft Windows Messenger™ or Outlook™ software.

The buddy list 306 is used to set up instant messaging calls and/or multimedia conferences. Thus, the buddy list 306 may be used to initiate a conference request that is provided to the advanced services module 216. The phone interface 304 is used to make calls, e.g., by typing in a phone number, and also allows invocation of supplementary service functions such as transfer, forward, etc. The collaboration interface 302 allows for viewing the parties to a conference or collaboration 302a and the type of media involved. It is noted that, while illustrated in the context of personal computers 122, similar interfaces may be provided the telephones or cellular telephones or PDAs. During a conference or collaboration, participants in the conference or collaboration may access or view shared documents or presentations, communicate with each other via audio, voice, data and/or video channels, etc.

MCU Resource Controller

Figure 6:
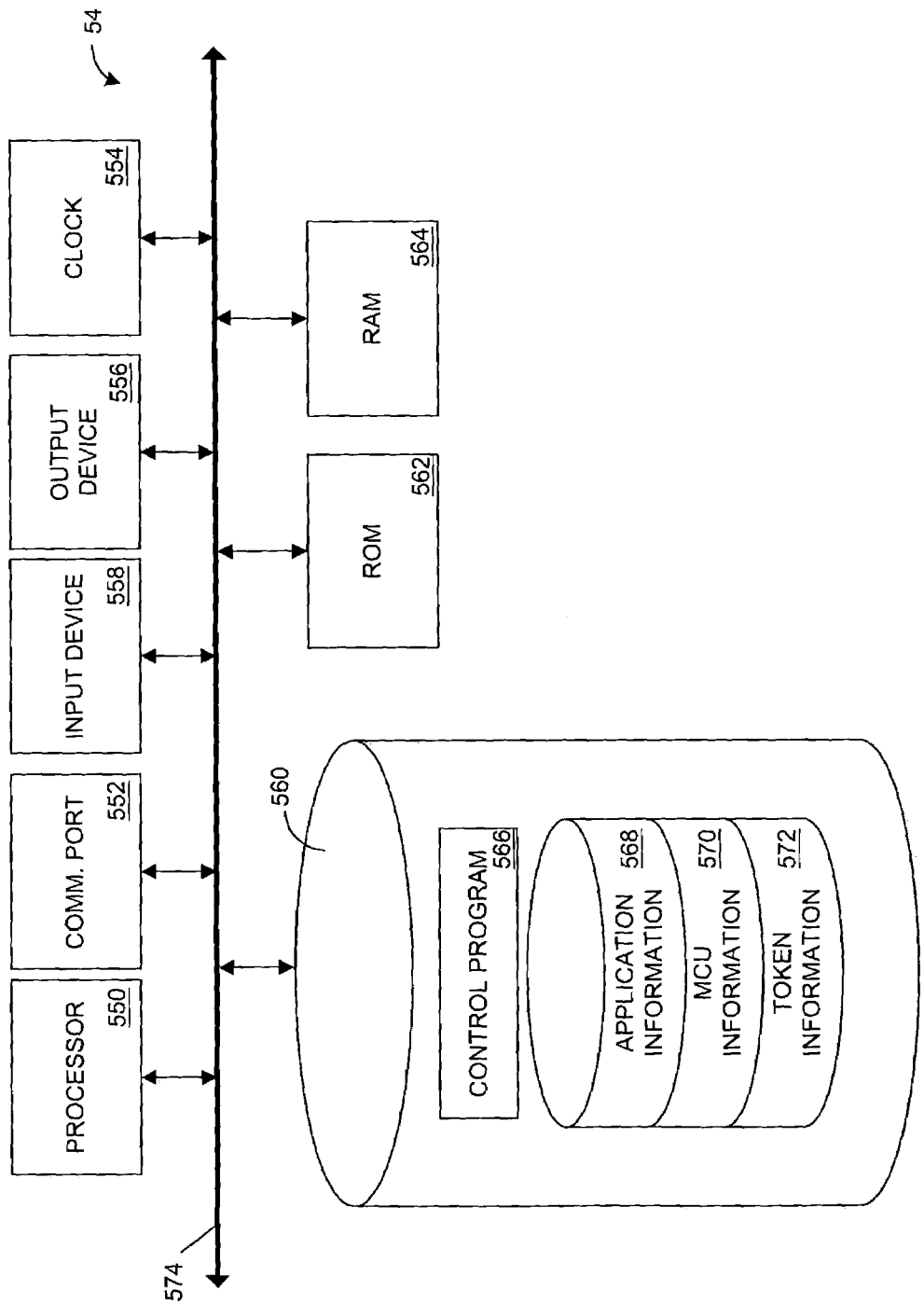
FIG. 6 is a block diagram of possible components that may be used in some embodiments of the server of FIG. 1.

Now referring to FIG. 6, a representative block diagram of a server or MCU resource controller 54 is illustrated. The MCU resource controller 54 can comprise a single device or computer, a networked set or group of devices or computers, a workstation, mainframe or host computer, etc., and may, in some embodiments, include some or all of the hardware and/or software components described above in regards to FIG. 3 and FIG. 4 (e.g., some or all of the hardware and/or software components of the server 104, the advanced services module 216, etc).

The MCU resource controller 54 may include a processor, microchip, central processing unit, or computer 550 that is in communication with or otherwise uses or includes one or more communication ports 552 for communicating with user devices and/or other devices. The processor 550 may be or include some or all of the controller 101 previously discussed above. In some embodiments, the processor 550 may be operative to implement one or more elements of the methods disclosed above. Communication ports may include such things as local area network adapters, wireless communication devices, Bluetooth technology, etc. The MCU resource controller 54 also may include an internal clock element 554 to maintain an accurate time and date for the MCU resource controller 54, create time stamps for communications received or sent by the MCU resource controller 54, etc.

If desired, the MCU resource controller 54 may include one or more output devices 556 such as a printer, infrared or other transmitter, antenna, audio speaker, display screen or monitor (e.g., the monitor 400), text to speech converter, etc., as well as one or more input devices 558 such as a bar code reader or other optical scanner, infrared or other receiver, antenna, magnetic stripe reader, image scanner, roller ball, touch pad, joystick, touch screen, microphone, computer keyboard, computer mouse, etc.

In addition to the above, the MCU resource controller 54 may include a memory or data storage device 560 (which may be or include the memory 103 previously discussed above) to store information, software, databases, documents, communications, device drivers, etc. The memory or data storage device 560 preferably comprises an appropriate combination of magnetic, optical and/or semiconductor memory, and may include, for example, Read-Only Memory (ROM), Random Access Memory (RAM), a tape drive, flash memory, a floppy disk drive, a Zip™ disk drive, a compact disc and/or a hard disk. The MCU resource controller 54 also may include separate ROM 562 and RAM 564.

The processor 550 and the data storage device 560 in the MCU resource controller 54 each may be, for example: (i) located entirely within a single computer or other computing device; or (ii) connected to each other by a remote communication medium, such as a serial port cable, telephone line or radio frequency transceiver. In one embodiment, the MCU resource controller 54 may comprise one or more computers that are connected to a remote server computer for maintaining databases.

A conventional personal computer or workstation with sufficient memory and processing capability may be used as the MCU resource controller 54. The MCU resource controller 54 may be capable of high volume transaction processing, performing a significant number of mathematical calculations in processing communications and database searches. A Pentium™ microprocessor such as the Pentium III™ or IV™ microprocessor, manufactured by Intel Corporation may be used for the processor 550. Equivalent processors are available from Motorola, Inc., AMD, or Sun Microsystems, Inc. The processor 550 also may comprise one or more microprocessors, computers, computer systems, etc.

The processor 550 may be able, adapted, or operative to receive a request from an application for allocation of an MCU for a conference; determine a MCU to handle the conference; create a resource address associated with the conference and the MCU, wherein the resource address includes a validation token; and provide the resource address to the application. The processor 550 also may be able, operative, or able to encode one or more validation tokens; provide resource addresses; to receive registration, keep alive or other data indicative of the capabilities or capacities of at least one MCU; to update and/or maintain a list, record, database, or other representation regarding at least one MCU; and/or to support or provide one or more other elements of the method 70 discussed above.

Software may be resident and operating or operational on the MCU resource controller 54. The software may be stored on the data storage device 560 and may include a control program 566 for operating the server, databases, etc. The control program 566 may control the processor 550. The processor 550 preferably performs instructions of the control program 566, and thereby operates in accordance with the present invention, and particularly in accordance with the methods described in detail herein. The control program 566 may be stored in a compressed, uncompiled and/or encrypted format. The control program 566 furthermore includes program elements that may be necessary, such as an operating system, a database management system and device drivers for allowing the processor 550 to interface with peripheral devices, databases, etc. Appropriate program elements are known to those skilled in the art, and need not be described in detail herein.

The MCU resource controller 54 also may include or store information regarding users, user devices, conferences, applications, MCUs, channels, documents, communications, etc. For example, information regarding one or more applications may be stored in a conference information database 568 for use by the MCU resource controller 54 or another device or entity. Information regarding one or more MCUs may be stored in a MCU information database 570 for use by the MCU resource controller 54 or another device or entity and information regarding one or more validation tokens may be stored in a token information database 572 for use by the MCU resource controller 54 or another device or entity. In some embodiments, some or all of one or more of the databases may be stored or mirrored remotely from the MCU resource controller 54.

According to some embodiments, the instructions of the control program may be read into a main memory from another computer-readable medium, such as from the ROM 562 to the RAM 564. Execution of sequences of the instructions in the control program causes the processor 550 to perform the process elements described herein. In alternative embodiments, hard-wired circuitry may be used in place of, or in combination with, software instructions for implementation of some or all of the methods described herein. Thus, embodiments are not limited to any specific combination of hardware and software.

The processor 550, communication port 552, clock 554, output device 556, input device 558, data storage device 560, ROM 562, and RAM 564 may communicate or be connected directly or indirectly in a variety of ways. For example, the processor 550, communication port 552, clock 554, output device 556, input device 558, data storage device 560, ROM 562, and RAM 564 may be connected via a bus 574.

While specific implementations and hardware configurations for the MCU resource controller 54 have been illustrated, it should be noted that other implementations and hardware configurations are possible and that no specific implementation or hardware configuration is needed. Thus, not all of the components illustrated in FIG. 5 may be needed for the MCU resource controller 54 implementing the methods disclosed herein.

The methods described herein may be embodied as a computer program developed using an object oriented language that allows the modeling of complex systems with modular objects to create abstractions that are representative of real world, physical objects and their interrelationships. However, it would be understood by one of ordinary skill in the art that the invention as described herein could be implemented in many different ways using a wide range of programming techniques as well as general-purpose hardware systems or dedicated controllers. In addition, many, if not all, of the elements for the methods described above are optional or can be combined or performed in one or more alternative orders or sequences without departing from the scope of the present invention and the claims should not be construed as being limited to any particular order or sequence, unless specifically indicated.

Each of the methods described above can be performed on a single computer, computer system, microprocessor, etc. In addition, two or more of the elements in each of the methods described above could be performed on two or more different computers, computer systems, microprocessors, etc., some or all of which may be locally or remotely configured. The methods can be implemented in any sort or implementation of computer software, program, sets of instructions, code, ASIC, or specially designed chips, logic gates, or other hardware structured to directly effect or implement such software, programs, sets of instructions or code. The computer software, program, sets of instructions or code can be storable, writeable, or savable on any computer usable or readable media or other program storage device or media such as a floppy or other magnetic or optical disk, magnetic or optical tape, CD-ROM, DVD, punch cards, paper tape, hard disk drive, Zip™ disk, flash or optical memory card, microprocessor, solid state memory device, RAM, EPROM, or ROM.

Although the present invention has been described with respect to various embodiments thereof, those skilled in the art will note that various substitutions may be made to those embodiments described herein without departing from the spirit and scope of the present invention. The invention described in the above detailed description is not intended to be limited to the specific form set forth herein, but is intended to cover such alternatives, modifications and equivalents as can reasonably be included within the spirit and scope of the appended claims.

The words "comprise," "comprises," "comprising," "include," "including," and "includes" when used in this specification and in the following claims are intended to specify the presence of stated features, elements, integers, components, or steps, but they do not preclude the presence or addition of one or more other features, elements, integers, components, steps, or groups thereof.

What is claimed is:

1. A method for facilitating access to a conference, comprising:
   receiving a request from an application for allocation of an MCU for a conference;
   determining a MCU to handle said conference;
   creating a resource address associated with said conference and said MCU, wherein said resource address has an associated validation token;
   providing said resource address and said validation token to said applications and
   using the validation token to validate a call is authorized to participate in a conference.

2. The method of claim 1, wherein said resource address includes said validation token.

3. The method of claim 1, wherein said validation token includes a checksum associated with said resource address.

4. The method of claim 1, wherein said request includes at least one of the following:
   data indicative of a type of conference;
   data indicative of at least one media preference;
   data indicative of a number of channels requested for said conference; and
   data indicative of a resource address of an existing conference.

5. The method of claim 1, wherein said validation token includes at least one of the following:
   data indicative of an identifier associated with said conference;
   data indicative of an identifier associated with a party allowed to participate in said conference;
   data indicative of a start time associated with said conference; and
   data indicative of an ending time associated with said conference.

6. The method of claim 1, wherein said validation token includes at least one of the following:
   data indicative of a maximum size associated with said conference;
   data indicative of a resource assigned to said conference;
   data indicative of said application; and
   data indicative of said MCU.

7. The method of claim 1, wherein said resource address includes at least one of the following:
   data indicative of an identifier associated with said conference;
   data indicative of an identifier associated with a party allowed to participate in said conference;
   data indicative of a start time associated with said conference; and
   data indicative of an ending time associated with said conference.

8. The method of claim 7, wherein said validation token secures at least one of the following:
   said data indicative of an identifier associated with said conference;
   said data indicative of an identifier associated with a party allowed to participate in said conference;
   said data indicative of a start time associated with said conference; and
   said data indicative of an ending time associated with said conference.

9. The method of claim 1, wherein said resource address includes at least one of the following:
   data indicative of a maximum size associated with said conference;
   data indicative of a resource assigned to said conference;
   data indicative of said application; and
   data indicative of said MCU.

10. The method of claim 9, wherein said validation token secures at least one of the following:
    said data indicative of a maximum size associated with said conference;
    said data indicative of a resource assigned to said conference;
    said data indicative of said application; and
    said data indicative of said MCU.

11. The method of claim 1, wherein said conference has an associated first party allowed to participate in said conference and wherein said validation token includes data indicative of said first party.

12. The method of claim 11, wherein said conference has an associated second party allowed to participate in said conference, and wherein said creating a resource address associated with said conference and said MCU includes creating a first resource address having a first validation token that includes data indicative of said first party and creating a second resource address having a second validation token that includes data indicative of said second party.

13. The method of claim 1, further comprising:
    receiving data from said MCU, said data being indicative of at least one capability of said MCU.

14. The method of claim 1, further comprising:
    receiving a keep alive message from said MCU.

15. The method of claim 1, further comprising:
    receiving said validation token, wherein said validation token is associated with a first call;
    determining that said first call is authorized to join said conference based, at least in part, on said validation token.

16. The method of claim 1, wherein said validation token is encoded.

17. The method of claim 1, further comprising:
allowing access to said conference by a party that provides said validation token.

18. The method of claim 1, further comprising:
registering said MCU.

19. The method of claim 1, further comprising:
receiving data indicative of a request to initiate a conference.

20. The method of claim 1, further comprising:
providing said resource address to at least one party.

21. A system for facilitating a conference, comprising:
a memory;
a communication port; and
a processor connected to said memory and said communication port, said processor being operative to:
receive a request from an application for allocation of an MCU for a conference;
determine a MCU to handle said conference;
create a resource address associated with said conference and said MCU, wherein said resource address has an associated validation token;
provide said resource address and said validation token to said application; and use the validation token to validate a call is authorized to participate in a conference.

22. The system of claim 21, wherein said processor is further adapted to receive data from said MCU indicative of at least one capability of said MCU.

23. The system of claim 21, where said processor is further adapted to encode said validation token.

24. A system, comprising:
an application in communication with an MCU resource controller;
wherein said application is adapted to provide a request to said MCU resource controller to allocate an MCU for a conference;
wherein said MCU resource controller is adapted to allocate an MCU to host said conference and to create a resource address associated with said MCU and said conference;
wherein said resource address has an associated validation token; and
wherein said MCU resource controller is adapted to provide said resource address and said validation token to said application; and
wherein said MCU is adapted to use the validation token to validate a call is authorized to participate in a conference.

25. A computer program product in a computer readable medium for facilitating a conference, comprising:
instructions for obtaining a request from an application for allocation of an MCU for a conference;
instructions for identifying a MCU to handle said conference;
instructions for generating a resource address associated with said conference and said MCU, wherein said resource address has an associated validation token;
instructions for sending said resource address and said validation token to said application; and
instructions for using the validation token to validate a call is authorized to Participate in a conference.

* * * * *